United States Patent [19]
Ashourian

[11] Patent Number: 5,849,350
[45] Date of Patent: *Dec. 15, 1998

[54] PROCESS FOR PRODUCING SHELF-STABLE FRUIT PRODUCTS BY FRUIT CELL FRAGMENTATION AND PRODUCTS PRODUCED THEREBY

[76] Inventor: Jamshid Ashourian, 1026 Oxford Rd., Deerfield, Ill. 60015

[*] Notice: This patent issued on a continued prosecution application filed under 37 CFR 1.53(d), and is subject to the twenty year patent term provisions of 35 U.S.C. 154(a)(2).

[21] Appl. No.: 545,526

[22] Filed: Oct. 19, 1995

Related U.S. Application Data

[63] Continuation-in-part of Ser. No. 512,089, Aug. 7, 1995, abandoned.

[51] Int. Cl.$^6$ ..................................................... A23L 1/025
[52] U.S. Cl. ..................... 426/615; 426/330.5; 426/519; 426/521; 426/599; 426/616
[58] Field of Search ........................... 426/599, 615, 426/616, 519, 521, 330.5

[56] References Cited

U.S. PATENT DOCUMENTS

| | | | |
|---|---|---|---|
| 2,696,440 | 12/1954 | Ball | 99/105 |
| 3,634,128 | 1/1972 | Bolin | 99/205 |
| 3,892,877 | 7/1975 | Wagner et al. | 426/365 |
| 3,976,805 | 8/1976 | Becker | 426/599 |
| 4,089,985 | 5/1978 | Wolff | 426/599 |
| 4,374,865 | 2/1983 | Strobel | 426/599 |
| 4,737,367 | 4/1988 | Langer et al. | 426/72 |
| 4,971,824 | 11/1990 | Jonas | 426/565 |
| 5,248,515 | 9/1993 | Payton et al. | 426/599 |

*Primary Examiner*—Helen Pratt
*Attorney, Agent, or Firm*—Gardner, Carton & Douglas

[57] ABSTRACT

Disclosed is a process for producing a shelf-stable, pourable fruit product from fresh and processed fruits, fruit purees and fruit juices, as well as the product so produced. The product is produced by a process which intentionally breaks the intact cellular structure of the fruit in order to substantially reduce average fruit particle size and facilitate formation of a complex or matrix of small particles surrounded by fluid. The product so produced has a high level of solid materials but is, due to the very small particle size, essentially free of sedimentation-related problems associated with soluble and suspended solids. The product has a moderate viscosity despite the large solids content and lack of viscosity enhancers, as well as an optimal °Brix without the addition of non-fruit sugar or acid.

22 Claims, No Drawings

5,849,350

PROCESS FOR PRODUCING SHELF-STABLE FRUIT PRODUCTS BY FRUIT CELL FRAGMENTATION AND PRODUCTS PRODUCED THEREBY

This is a continuation-in-part of application Ser. No. 08/512,089, filed Aug. 7, 1995, now abandoned.

FIELD OF THE INVENTION

The present invention relates to shelf-stable, pourable or spreadable all-fruit products, suitable for use as finished consumer products or as a food ingredient or flavoring system in producing other products, and a process for preparation of such fruit products.

BACKGROUND OF THE INVENTION

In this time of fast-paced living, fast food and health consciousness, there is an ever increasing demand for nutritious, convenient, all natural food products. Although fresh fruit and fruit-based products generally fulfill these requirements, both fresh fruit and processed fruit products suffer disadvantages.

The primary reasons consumers decline to purchase fresh fruit include that the fruit is too expensive, has a distasteful appearance, takes too much time to select and prepare (e.g., wash, cut, peel), is under or overripe, is not always in season, has too-short a shelf life and is of inconsistent quality. Consequently, some consumers purchase processed fruit for better taste and flavor, longer shelf life, ready availability, more consistent quality and price and to minimize the time and energy expended in selecting and preparing it. However, consumers generally see processed fruits as less nutritious and as offering less value and variety than fresh products.

In order to overcome the foregoing and other disadvantages associated with processed fruit products, the prior art teaches that manufacturers of such fruit products usually need to add sugar, viscosity enhancers, flavorings, vitamins and other additives to such products.

Another problem routinely encountered in processed fruit products incorporating fruit solids or fiber is sedimentation or settling of the soluble and insoluble solids to the bottom of the product container under the influence of gravity. Such sedimentation or settling can, among other things, adversely affect the flavor profile of a processed fruit product. For example, settling or sedimentation of soluble sugars in a fruit product, although often visually unnoticeable, can make the product at the bottom of the product container more sweet and the product at the top of the product container less sweet. As a result, the consistency of the product is variable. This, in turn, often leads to customer dissatisfaction and decreased, or at least varying, shelf-life of the product.

What would thus be advantageous is a natural fruit product which is nutritious (e.g., contains substantial fruit solids and fiber from the fruit), ready to use (e.g., pourable, spreadable), shelf-stable (e.g., no product sedimentation or separation due to gravity), lacking the flavor harshness commonly associated with fruit products and free of nonfruit additives such as preservatives, viscosity enhancers and colorings.

SUMMARY OF THE INVENTION

The present invention provides a fruit product and process for its preparation which addresses and overcomes the limitations of prior art products and processes by providing a unique, easy to use, nutritious and shelf-stable pourable or spreadable fruit product that may be used as a finished consumer product or as a food ingredient or flavoring system in producing other products. For example, the product may be used as a substitute for milk or as an enhancement to such products as yogurt, ice cream or virtually any other products employing fruit or fruit flavors. Additionally, the product may be mixed with, for example, fruit chunks.

The present invention accomplishes this by providing a pourable or spreadable, ready-to-use, natural fruit product having the nutritional content of unprocessed fresh fruit and which is superior to single ingredient fruit products. In this regard, the present invention also provides a preservative, additive and coloring-free product made from fresh fruits and juices and fresh fruit concentrates. The present invention also provides a processed fruit product retaining substantial fruit solids and fiber present in the unprocessed fruit.

The present invention provides a shelf-stable fruit product that minimizes or eliminates the waste associated with fresh fruit.

The fruit product has a stable and uniform suspended solids and soluble solids profile across the height of the container thus ensuring long-term product consistency and uniform shelf-life.

The fruit product may be substituted for milk in many applications traditionally reserved for milk (e.g., use with breakfast cereal). Correspondingly, the present invention provides a milk substitute for lactose intolerant consumers and consumers desirous of avoiding synthetic hormones and antibiotics common in milk production.

The fruit product is a pourable and spreadable fruit product naturally lacking the acidic or harsh flavor attributes common to most pourable fruit products and eliminated only through the use of additives such as sugar.

The fruit product is a pourable fruit product with a thicker consistency than fruit juices.

The fruit product is a processed, additive-free, pourable and spreadable fruit product lacking pits, stems, skins and harsh acid taste.

DETAILED DESCRIPTION OF THE INVENTION

The above and additional characteristics of the invention are realized in the present invention which will be described in connection with certain preferred embodiments. However, it should be understood that it is not intended to limit the invention to those particular embodiments. To the contrary, it is intended to cover all alternatives, modifications and equivalents falling within the spirit and scope of the invention as defined by the appended claims.

Many of the unique properties of the invention, such as the smoothness, texture and soluble and suspended solids profiles are due to the particle size reduction arising from use of process operations contrary, at least in part, to the teachings of the art. The principle processing steps of the present invention, each of which is discussed in context below, include fruit preparation, blending or mixing, fruit cell fragmenting (e.g., by means of a homogenizer, sonolator, stone mill, high-shear apparatus, emulsifier or any other device capable of breaking or fragmenting intact fruit cells) heating, filling, closing and cooling.

The initial process step comprises preparation of appropriate fruit purees and fruit juices. Transformation of fresh fruit into the desired purees and juices may be accomplished by means of various techniques known to the art (e.g., pulping, cooking, pressing). Alternatively, preblended puree and fruit juice concentrates may also be used. Where frozen purees and/or juices are utilized, each should be tempered or defrosted prior to processing to facilitate subsequent processing. In either case, the fruit purees and juices are blended to achieve the desired percent soluble solids (°Brix) and pH. The °Brix and pH of the fruit purees and juices chosen influence the flavor and other characteristics of the ensuing product although, as will be shown by the present invention, processing operations also exert a substantial influence on product characteristics. For example, the °Brix influences the perceived sweetness of the finished product and the pH influences the tartness or acidity of the finished product, while the present invention's unique processing operation influences, among other things, the suspension of soluble and insoluble solids.

After initial fruit preparation, all ingredients for each formulation (e.g., fruit puree(s), fruit juice(s), additional natural fruit flavor extracts, less than approximately 1100 mgs/kg ascorbic acid, vitamins) were mixed or blended together. The formulations envisioned herein typically comprise from about 23% to about 75% fruit puree by weight, preferably about 45%, and from about 35% to about 73% fruit juice by weight, preferably about 55%. The resulting puree and juice mixture, subsequent to additional processing as described below, has a total suspended solids profile of between 16% and 22% by weight, preferably about 19%.

After mixing or blending, the puree/juice mixtures were pumped, to a homogenizer and homogenized at a pressure sufficient to substantially break down the normally intact cellular structure, reduce the size of cell components and increase the solubility of natural bio-colloids and nutrients of the chosen purees. The equipment used herein comprised a 2-stage Niro Saovi Model NS2006L homogenizer (available from Niro Hudson, Inc., Hudson, Wis.). The homogenizer was operated at pressures between 1400 pounds per square inch (psi) and 2100 psi to accomplish the desired cell-breakage. The product, at 40°–45° F. (4.5°–7.2° C.), was processed at approximately 100 liters per hour. Various homogenization equipment configurations are available and the process parameters (e.g., pressure, orifice size) for each specific configuration will vary as a function of the equipment used. However, any configuration capable of inducing sufficient breakage of the puree cell structure is acceptable. Similarly, although homogenization of the mixture is preferred, any process capable of substantially fragmenting the intact fruit cells, such as use of a sonolator, stone mill, high-shear apparatus or emulsifier, may be used to induce cell fragmentation or breakage.

Traditionally, homogenization is used to preclude separation of undissolved constituent material, thus providing for a relatively smooth product of relatively even consistency. For example, in milk products, homogenization is used to prevent separation of the cream component from the milk component. Although homogenization of all-fruit products is virtually unknown and used for purposes unrelated to preventing separation of components, the present invention demonstrates that homogenization may similarly be used to prevent separation of undissolved materials in a fruit puree and increase the solubility of cellular components including natural biocolloids and complex carbohydrates. However, because the processing arts for fruits consider intact cells in products to give superior quality products and because most fruits achieve a puree by use of pulping apparatus which renders the product fluid or semi-fluid while attempting to maintain intact the cellular structure of the fruit, any cell breakage inhering in the processing is incidental, and minimal, rather than intentional, as is the cell breakage in the present invention.

The preferred embodiment of the present invention, contrary to the conventional practice in the art, uses the homogenization process to intentionally effect a degree of breakage of the cell structure substantially greater than the incidental breakage associated with traditional homogenization practice. The intentional breaking of the fruit cell structure frees pectin from the cell wall which is solubilized in the subsequent heating step, thus permitting formation of a pectin complex with some of the juice. Similarly, other cellular components formerly integral to the intact cell such as cellulose and complex carbohydrates are freed to form complexes with the juice.

The effects of intentionally breaking the intact cellular structure are several. For example, freeing of cellular constituents formerly retained as an integral part of the intact cellular structure provides an additional component or dimension to the flavor profile. Specifically, instead of the juice component providing the main flavor determinant, as it otherwise would, the cellular materials freed by breakage of the fruit puree cells tend to tone down and give a textural component to the flavor of the invention. In fact, breakage of the fruit puree cells results in the formation of a complex or matrix of small particulate moieties surrounded by fluid but spatially maintained by particle size and both stereotropic and ionic chemical interactions. The matrix, enhanced by the cellular components released and solublized during process operations, stabilizes the fluid suspension, imparts viscosity and, in conjunction with the unique blend of juices, purees and puree cellular components, gives a more balanced flavor to the invention, one lacking the harshness normally associated with fruit products produced from high acid fruits such as many of those contemplated by the invention.

In addition, the use of homogenization to break the intact cellular structure of the fruit purees unexpectedly provides a degree of stability to the puree/juice mixture that effectively eliminates the problem of sedimentation commonly associated with fluid products that have a high percentage of solids contained therein. This too is due to the complexes formed by the now-freed cellular components and the juice. This characteristic of the invention is described more fully below in evaluating invention examples and prior art products.

After homogenization, the mixture is subsequently pumped, preferably using a positive displacement pump, to a heat exchanger operating at a temperature of between 185°–200° F. (85°– 93° C.) to heat the product sufficiently to substantially destroy possibly entrained yeasts and molds. When heating the viscous mixture of the present invention, agitation of the mixture must be employed to minimize burning of product by the heat exchanger surfaces. Upon exiting the heat exchanger, the product is hot-filled into glass jars. The jars are then capped, sealed and maintained at elevated temperature (e.g., 185°–200° F. (85°–93° C.)) for a time (e.g., 10–15 minutes) necessary to substantially ensure destruction of any yeasts or molds present. Upon exiting the heat exchanger, the product is hot filled, at approximately 190° F. (88° C.), into glass jars. The jars are then capped, sealed and maintained at approximately 185° F. (85° C.) for a period of time sufficient to substantially ensure destruction of any yeasts, molds or vegetative bacteria present, typically, one to two minutes. The product is then cooled by appropriate means (e.g., spraying a light mist of water onto the sealed jars). Alternatively, the hot product may be aseptically cooled and filled into sterile containers.

The blend of fruit purees and fruit juices of the present invention, in conjunction with the use of homogenization processes to destroy the intact cellular structure of a significant portion of fruit puree cells, imparts many attributes or characteristics to the products of the invention. The following specific examples illustrate several embodiments of the present invention and their relative characteristics. However, these examples are not to be construed as limiting the scope of the invention. All percentages are based on weight.

EXAMPLE 1

Tropical Mango Product

| Ingredients | Weight % |
| --- | --- |
| White Grape Juice | 25.00% |
| Apple Juice | 17.00% |
| Mango Puree | 32.95% |
| Apple Puree | 25.00% |
| Mango Flavor | 0.05% |
| Ascorbic Acid | 770 mg/kg |
| Total | 100.00% |

The ingredients for tropical mango comprised U.S.D.A. Standard white (i.e., light amber) grape juice (initial °Brix=68, reconstituted °Brix=15.0, pH=3.54), frozen apple juice concentrate (initial °Brix=70, reconstituted °Brix=14.75, pH=3.76), frozen mango puree (°Brix=15.5, pH=3.79), frozen golden apple puree concentrate (°Brix=38, pH=3.83), natural mango flavor type 596.498/C (available from Firmenich, Inc., Plainsboro, N.J.) and ascorbic acid. The tropical mango ingredients were processed as described above and the resulting product evaluated against other embodiments of the present invention as well as five closely related prior art products. Evaluation results are provided in Tables 1 and 2 and discussed more fully below.

EXAMPLE 2

Apple-Mixed Berry Product

| Ingredients | Weight % |
| --- | --- |
| White Grape Juice | 15.90% |
| Apple Juice | 20.54% |
| Strawberry Puree | 15.28% |
| Blueberry Puree | 11.48% |
| Raspberry Puree | 8.82% |
| Apple Puree | 27.93% |
| Mixed-berry Flavor | 0.05% |
| Total | 100.00% |

The ingredients for mixed-berry comprised U.S.D.A. Standard white (i.e., light amber) grape juice (initial °Brix=68, reconstituted °Brix=15.0, pH=3.54), frozen apple juice concentrate (initial °Brix=70, reconstituted °Brix=14.75, pH=3.76), frozen strawberry puree (°Brix=8.5 pH=3.56), frozen blueberry puree (°Brix=7.25 pH=3.76), frozen raspberry puree (°Brix=8.0, pH=3.31), frozen golden apple puree concentrate (°Brix=38, pH=3.83) and natural mixed-berry WONF 587.237/T (available from Firmenich, Inc., Plainsboro, N.J.). The mixed-berry ingredients were processed as described above and the resulting product evaluated against other embodiments of the present invention as well as five closely related prior art products. Evaluation results are provided in Tables 1 and 2 and discussed more fully below.

EXAMPLE 3

Apple-Blueberry Product

| Ingredients | Weight % |
| --- | --- |
| White Grape Juice | 18.62% |
| Apple Juice | 14.67% |
| Blueberry Puree | 8.33% |
| Apple Puree | 30.00% |
| Red Grape Juice | 28.33% |
| Blueberry Flavor | 0.05% |
| Total | 100.00% |

The ingredients for apple-blueberry comprised U.S.D.A. Standard white (i.e., light amber) grape juice (initial °Brix=68, reconstituted °Brix=15.0, pH=3.54), frozen apple juice concentrate (initial °Brix=70, reconstituted °Brix=14.75, pH=3.76), frozen blueberry puree (°Brix=7.25 pH=3.76), frozen golden apple puree concentrate (°Brix=38, pH=3.83), frozen concord grape juice (initial °Brix=68, reconstituted °Brix=16.0, pH=3.30) and (available from Firmenich, Inc., Plainsboro, N.J.) natural blueberry 596.351/T. The apple-blueberry ingredients were processed as described above and the resulting product evaluated against other embodiments of the present invention as well as five closely related prior art products. Evaluation results are provided in Tables 1 and 2 and discussed more filly below.

EXAMPLE 4

Pear-Raspberry Product

| Ingredients | Weight % |
| --- | --- |
| White Grape Juice | 20.78% |
| Apple Juice | 19.00% |
| Blueberry Puree | 8.34% |
| Apple Puree | 15.00% |
| Red Grape Juice | 25.00% |
| Blueberry Flavor | 3.50% |
| Grapefruit Juice | 8.33% |
| Raspberry Flavor | 0.05% |
| Total | 100.00% |

The ingredients for pear-raspberry comprised U.S.D.A. Standard white (i.e., light amber) grape juice (initial °Brix=68, reconstituted °Brix=15.0, pH=3.54), frozen apple juice concentrate (initial °Brix=70, reconstituted °Brix=14.75, pH=3.76), frozen raspberry puree (°Brix=8.0, pH=3.31), frozen golden apple puree concentrate (°Brix=38, pH=3.83), pear puree (°Brix=32.0, pH=3.82) frozen concord grape juice (initial °Brix=68, reconstituted °Brix=16.0, pH=3.30), frozen grapefruit juice concentrate (initial °Brix=58.0, reconstituted °Brix=10.2) and natural raspberry WONF 596.016/T (available from Firmenich, Inc., Plainsboro, N.J.). The pear-raspberry ingredients were processed as described above and the resulting product evaluated against other embodiments of the present invention as well as five closely related prior art products. Evaluation results are provided in Tables 1 and 2 and discussed more fully below.

EXAMPLE 5

Orange-Banana Product

| Ingredients | Weight % |
|---|---|
| White Grape Juice | 12.55% |
| Apple Juice | 8.50% |
| Banana Puree | 20.00% |
| Apple Puree | 25.00% |
| Orange Juice | 33.75% |
| B-carotene | 0.20% |
| Total | 100.00% |

The ingredients for orange-banana comprised U.S.D.A. Standard white (i.e., light amber) grape juice (initial °Brix=68, reconstituted °Brix=15.0, pH=3.54), frozen apple juice concentrate (initial °Brix=70, reconstituted °Brix=14.75, pH=3.76), banana puree (°Brix=20.25, pH=5.17), frozen golden apple puree concentrate (°Brix=38, pH=3.83), orange juice concentrate (initial °Brix=60.0, reconstituted °Brix=11.8) and Warner-Jenkinson No. 3002 Beta Carotene 2% WD emulsion (available from Warner-Jenkinson Co., Inc., St. Louis, Mo.). The orange-banana ingredients were processed as described above and the resulting product evaluated against other embodiments of the present invention as well as five closely related prior art products. Evaluation results are provided in Tables 1 and 2 and discussed more fully below.

TABLE 1

INVENTION PRODUCTS

| Analysis | Mango | Mixed-berry | Apple-blueberry | Pear-raspberry | Orange-banana |
|---|---|---|---|---|---|
| Viscosity (Bostwick; cm/30 sec @ 64° F.) | 8.07 | 6.63 | 8.90 | 7.33 | 11.77 |
| % Soluble Solids (°Brix) | 19.58 | 18.82 | 20.33 | 19.90 | 18.00 |
| Total Sugar (g) | 17.5 | 15.8 | 19.0 | 16.2 | 18.4 |
| Particle Size: (% of Product that remained in 150 mesh screen) | 77.74 | 76.18 | 64.15 | 68.00 | 62.25 |

Bostwick viscosity of between 6.63 and 11.77 cm. The preferred range of Bostwick viscosities for the invention, however, is between 3 and 15 centimeters per 30 seconds at 64° F. Between 62.25% and 76.18% of the suspended solids are trapped by passing the example products through a 150 mesh screen having openings of 0.0041 inches during serial screening. For the invention, however, it is preferred that between 50% and 80% of the suspended solids are trapped by the screen. This moderate viscosity despite a substantially high suspended solids content is a direct consequence of the homogenization process described herein. Specifically, because the claimed homogenization process intentionally destroys cellular structures rather than preserving them as does traditional homogenization, the product invention consists of discrete particulate fruit fragments uniformly suspended in the juice component. These discrete particulate fruit fragments range in size from approximately 0.0100 inches to 0.0020 inches, particles of approximately 0.0050 inches predominating.

As seen from Table 2, the prior art products either achieve a high solids content at the expense of a pourable viscosity or achieve their viscosity by means of viscosity enhancers and a much lower solids content. For example, 90% of the Gerber Brand Apple-Blueberry Baby Food was retained by a 150 mesh screen. However, the Bostwick viscosity was only 3.42. Conversely, Smuckers Brand Strawberry Syrup had a Bostwick viscosity of 21.58 but with 0.00% solids retained in a 150 mesh screen. Significantly, the Smuckers product achieves its viscosity by adding pectin and xanthan gum. Moreover, while products of the present invention exhibited no sedimentation or separation of phase for a period of at least six months, evaluated prior art products exhibited sedimentation or phase separation within weeks, if not days or hours.

The particle size achieved by breaking the cellular structure by homogenization has several effects, one of which is a percent soluble solids or °Brix (i.e., sugar profile) considered optimal for prior art products but achieved here without the need to add sugar or adjust pH. In most processed fruit products, the flavor is imparted by the fluid or juice component which in most cases is supplemented with sugar and/or acid to achieve the 16 to 22 °Brix long considered optimal. In the present invention, the unique particle size achieved by nontraditional homogenization provides the ability to obtain an optimal sugar profile, and thus optimal flavor perception, without the need to adjust the sugar content or pH achieved by the invention process.

TABLE 2

PRIOR ART

| Analysis | Pear Nectar | Dole Brand Orchard Peach | Gerber Brand Apple/Blueberry | Polaner Pourable Fruit/Blueberry | Smuckers Brand Strawberry Syrup | Odwalla Mango Tango |
|---|---|---|---|---|---|---|
| Viscosity (Bostwick) | Too Fluid To Measure | Too Fluid To Measure | 3.42 | 14.33 | 21.58 | 20.33 |
| % Soluble Solids | 13.93 | 13.00 | 11.5 | 53.68 | 65.42 | 13.00 |
| Total Sugar (g) | 12.5 | 11.5 | 9.8 | 44.4 | 52.3 | 11.0 |
| Particle Size: (% of Product that remained in 150 mesh screen) | 15.12 | 0.00 | 90.00 | 26.15 | 0.00 | 20.58 |

One significant attribute of the present invention, as opposed to comparable prior art products, is the long-term stability of the soluble and suspended solids profiles. As shown in Table 1, the five example products exhibit a Many fresh fruits have standard sugar contents somewhat below the optimal 16 to 22% level. Thus, it is common practice to add additional sugar when the fruit is processed. Other fruits have substantially greater amounts of sugar added during processing to compensate for poor quality raw material. Even though the invention process incorporates numerous fruits which individually have standards of °Brix identity below the desired sugar level, the cellular breakdown caused by the homogenization process of the present invention results in a product with a sugar content close to the industry ideal for a fruit product. These sugars are primarily the easily digested invert sugars glucose and fructose with lesser amounts of sucrose.

In addition to contributing to an optimal sugar level in the present invention, breakdown of the cellular structure and subsequent small suspended particle size optimizes flavor perception. That is, the invention's stable suspension of very small whole fruit particulates intimately associated in the fluid juice component not only imparts viscosity to the invention but also imparts a unique flavor. The intensity of this flavor, although somewhat enhanced over the unprocessed fruit, is nonetheless mellowed by the unique blend of fruit acids and sugars arising, at least in part, from cellular breakdown during homogenization. The discrete whole fruit particles impart a fresh fruit flavor which is distinct relative to the flavor of the juice component. Unlike prior art products which utilize texture enhancers to impart viscosity to the product, the flavor of the present invention is distinctly fruity. This is due to the fact that where viscosity enhancers are used, the product flavor is somewhat characterized by the texture of the enhancer, whether it be, for example, pectin, gum, starches or alginate. Moreover, because product pH must also be adjusted when using viscosity enhancers so as to achieve the desired viscosity and mouthfeel, the product flavor profile is further changed. Specifically, introduction of acids or bases to achieve an optimum pH for such artificial viscosity enhancers would impart, e.g., harshness of flavor and necessitate the addition of sugar to ameliorate the harshness. The present invention solves these and other problems of the prior art by, for example, homogenizing fruit juice and fruit puree mixtures so as to cause cellular breakage of greater than about 10% of the intact fruit cells during the homogenization process.

Tables 3 and 4 provide representative data showing the degree of cellular breakage or fragmentation realized in accordance with the present invention. Specifically, Table 3 shows the number of cells per microliter present, before processing, in the various purees used to formulate the example products of the invention. Similarly, Table 4 provides the number of cells per microliter present in the example products after processing. For example, after accounting for the weighted average of each puree present in the Tropical Mango example product, only about three percent (3%) of the fruit puree cells remained intact after processing in accordance with the invention. In other words, approximately 97% of the intact puree cells present before processing were intentionally fragmented or broken by processing them in accordance with the invention. Correspondingly, for the Apple-Mixed Berry, Apple-Blueberry, Pear-Raspberry and Orange-Banana example products, only approximately 24%, 39%, 32% and 26%, respectively, of the fruit puree cells remained intact after processing. That is, approximately 76%, 61%, 68% and 74%, respectively, of the intact puree cells present in the example products before processing were broken after processing them in accordance with the invention. Thus, as described above, the degree of intentional cellular breakage is an important feature of the present invention in solving the above and other problems of the prior art.

TABLE 3

RESULTS OF CELLULAR EVALUATION
FOR RAW MATERIALS BEFORE HOMOGENIZATION

| Raw Material | No. of Cells/Microliter |
| --- | --- |
| Pear Puree | 37 |
| Apple Puree | 140 |
| Blueberry Puree | 6 |
| Mango Puree | 600 |
| Strawberry Puree | 34 |
| Raspberry Puree | 6 |
| Banana Puree | 0 |

TABLE 4

RESULTS OF CELLULAR EVALUATION
FOR FINISHED PRODUCTS AFTER HOMOGENIZATION

| Finished Product | No. of Cells/Microliter |
| --- | --- |
| Apple-Mixed Berry | 11 |
| Apple-Blueberry | 17 |
| Tropical Mango | 6 |
| Pear-Raspberry | 10 |
| Orange-Banana | 9 |

I claim:

1. A process for producing a pourable fruit product from a mixture of a fruit purees including intact fruit cells, and a fruit juice wherein intact cells within the mixture are fragmented, said process comprising the steps of combining the fruit puree and the fruit juice to form the mixture, homogenizing the mixture to induce sufficient fruit cell fragmentation and breakage to produce a suspension having a percent soluble solids content which is between 16 and 22% by weight, a viscosity equivalent to a Bostwick viscosity between 3 and 15 centimeters per 30 seconds at 64 F., and a plurality of fruit cell fragments having differing particle sizes such that between 50% and 80% of the product by weight will be retained by a 150 mesh screen.

2. A process in accordance with claim 1 wherein the fruit puree and the fruit juice are prepared from fresh fruit.

3. A process in accordance with claim 1 wherein the fruit puree and the fruit juice are prepared from processed fruit.

4. A process in accordance with claim 1 wherein the fruit puree and the fruit juice are prepared by reconstituting at least one fruit puree from a fruit puree concentrate and reconstituting at least one fruit juice from a fruit juice concentrate.

5. A process in accordance with claim 1 wherein the product viscosity is equivalent to a Bostwick viscosity between 6 and 12 centimeters per 30 seconds at 64° F.

6. A process in accordance with claim 1 wherein substantially no viscosity enhancers are added.

7. A process in accordance with claim 1 wherein the fruit puree comprises between 50% and 75% by weight of the total product weight.

8. A process in accordance with claim 1 wherein substantially no non-fruit sugar is added.

9. A process in accordance with claim 1 wherein fruit flavoring is added to the blended fruit.

10. A process in accordance with claim 1 wherein beta-carotene is added to the blended fruit.

11. A process in accordance with claim 1 wherein less than approximately 1100 mg/kilogram of ascorbic acid is added to the blended fruit.

12. A process in accordance with claim 1 wherein between about 50% and about 97% of the intact fruit cells are fragmented by the process.

13. A fruit product prepared in accordance with the process of claim 1.

14. A pourable fruit product made from a mixture of a fruit puree, including intact fruit cells, and a fruit juice wherein intact fruit cells within the mixture are fragmented into a plurality of fruit particles and soluble solids in a process of making the product, said product comprising at least one fruit puree and at least one fruit juice, wherein the average particle size ranges from between approximately 0.0010 inches and 0.0200 inches, and further wherein the mixture has been homogenized such that greater than about 10% of the intact fruit cells are fragmented during said process and further wherein the product has a percent soluble solids content which is between 16 and 22% by weight, a viscosity equivalent to a Bostwick viscosity between 3 and 15 centimeters per 30 seconds at 64 F., and a plurality of fruit cell fragments having differing particle sizes such that between 50% and 80% of the product by weight will be retained by a 150 mesh screen.

15. A mixture in accordance with claim 14 wherein between 50% and 80% of the product by weight will be stopped by a 150 mesh screen.

16. A mixture in accordance with claim 14 wherein between about 50% and about 97% of the intact fruit cells are fragmented.

17. A mixture in accordance with claim 14 wherein fruit flavoring is added to the mixture.

18. A mixture in accordance with claim 14 wherein beta-carotene is added to the mixture.

19. A mixture in accordance with claim 14 wherein less than approximately 1100 mg/kilogram of ascorbic acid is added to the mixture.

20. The product of claim 14 wherein the fruit cell fragments and soluble solids remain in suspension within the pourable fruit product without observable sedimentation and settling for at least six months after fragmentation.

21. A process for producing a pourable fruit product from a mixture of a fruit puree including intact fruit cells and a fruit juice wherein intact fruit cells within the mixture are fragmented during processing, said process comprising the steps of combining the fruit puree and the fruit juice to form the mixture, and fragmenting a portion of the intact fruit cells of the mixture to induce sufficient fruit cell fragmentation and breakage such that the mixture can be transformed into a suspension in which the fruit cell fragments remain in suspension without observable sedimentation for at least six months after, wherein the step of fragmenting results in fragmentation of greater than about 10% of the intact fruit cells and a pourable fruit product having a viscosity equivalent to a Bostwick viscosity between 3 and 15 centimeters per 30 seconds at 64 F. and a percent suspended solids content of 16 and 22% by weight, wherein fruit particles within the suspended solids have an average particle size of from between about 0.0100 inches and about 0.0020 inches and between 50% and 80% of suspended solids within the pourable fruit product are retained within a 150 mesh screen after an attempt to pass the pourable fruit product through such a screen.

22. A process for producing a shelf-stable pourable fruit product from a mixture of a fruit puree including, intact fruit cells, and added fruit juice wherein intact fruit cells within the mixture are fragmented during processing, said process comprising the steps of combining the fruit puree and the fruit juice to form the mixture, and incorporating the added fruit juice into a suspension matrix within the pourable fruit product by fragmenting at least a portion of the intact fruit cells of the mixture to induce sufficient fruit cell fragmentation and breakage to thereby transform the mixture into a suspension of fruit fragments and soluble solids in which the fruit cell fragments and soluble solids remain in suspension within the pourable fruit product without observable sedimentation for at least six months after fragmentation, wherein the step of incorporating results in fragmentation of greater than about 10% of the intact fruit cells and further wherein the product has a percent soluble solids content which is between 16 and 22% by weight, a viscosity equivalent to a Bostwick viscosity between 3 and 15 centimeters per 30 seconds at 64 F. and a plurality of fruit cell fragments having differing particle sizes such that between 50% and 80% of the product by weight will be retained by a 150 mesh screen.

* * * * *